Martin Briggs.  Hanging Spindles & Shafting.
No. 117597.  Fig. 1.  Patented Aug. 1 1871.
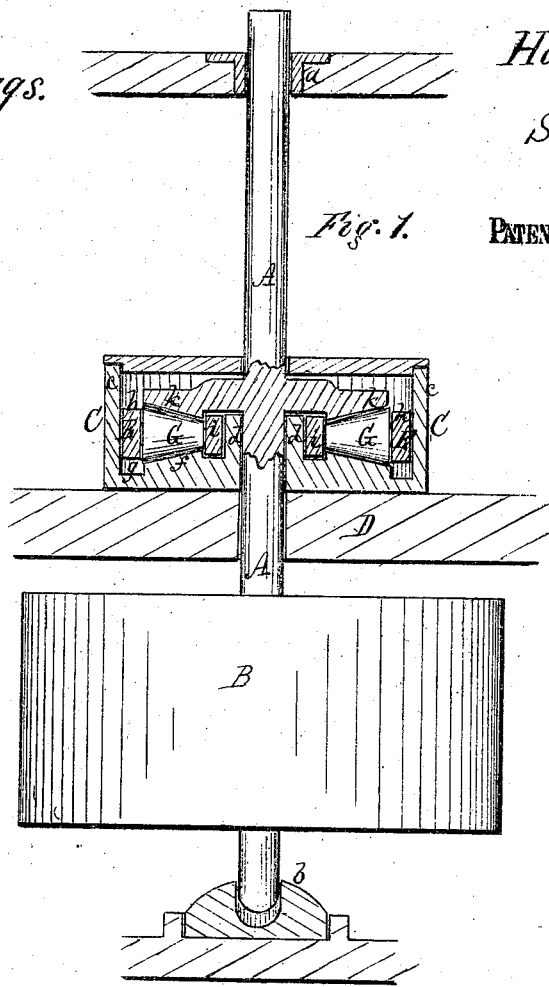
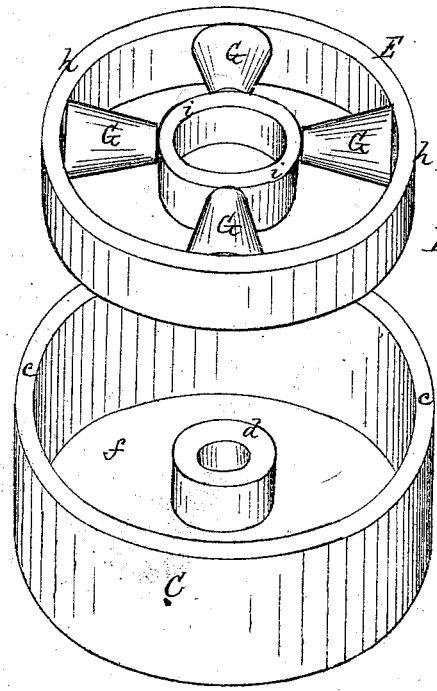
Fig. 2.
Witnesses.
K. F. Osgood
Arch.d Baine
Inventor.
Martin Briggs
By Burke Fraser & Co.
Att'ys
Rochester
N.Y.

UNITED STATES PATENT OFFICE.

MARTIN BRIGGS, OF ROCHESTER, NEW YORK.

IMPROVEMENT IN BEARINGS FOR VERTICAL SHAFTS.

Specification forming part of Letters Patent No. 117,597, dated August 1, 1871.

*To all whom it may concern:*

Be it known that I, MARTIN BRIGGS, of the city of Rochester, county of Monroe and State of New York, have invented a certain new and useful Improvement in Hanging Spindles or Shafting, of which the following is a specification:

This invention consists in hanging or suspending the spindles or shafts of various kinds of machinery upon a bearing, which consists of conical rollers attached to revolving rings that rest and turn in a box, which also serves as an oil-box.

In the drawing, Figure 1 is a central vertical section of my improvement. Fig. 2 is a perspective view of the friction-rings and the oil-box separated.

A represents the spindle or shaft, which may belong to any kind of machinery—for instance, a water-wheel or millstone, B. The upper and lower ends may rest in bearings $a$ $b$, which serve merely as guides to retain the spindle in an upright position, but without supporting it. C represents the oil-box, which is made of considerable size, and rests on a suitable support, D. It consists of an outer rim, $c$, a central hub, and an angular or inclined floor, $f$, for the cone-rollers to run upon. E represents the roller-bearing. It consists of two annular rings, $h$ $i$, having a series of conical friction-rollers, G G, between. The outer ring rests just inside the inner periphery of the oil-box, while the inner ring rests closely around the hub $d$. The conical rollers rest upon the floor $f$, and support on top a similar angular plate, $k$, which is solid on the spindle. The spindle is thus supported by the friction-rollers, and no weight comes upon the step at the bottom, which, in ordinary machinery, is constantly wearing away.

I am aware that in water-wheels and other machinery the spindle has been suspended upon a bearing so as to remove the weight from the step; and I am also aware that friction-rollers are common in various relations. These in the abstract I do not claim. My invention consists in combining with the inclosing oil-box the rings $h$ $i$, having the friction-rollers attached between, so that the latter may travel around upon the angular floor, and not remain stationary, while the rings themselves serve to retain them in place upon the hub $d$ and within the circle of the inclosing box. Simple friction-rollers fixed in a stationary position would not answer the purpose in heavy machinery, as the great weight would be too much for their axes or journals. In my case there is no pressure upon the journals, for the reason that the opposing pressure comes on both faces of the rollers, and is, therefore, equalized. The wear is also less. The journals serve only to keep the rollers in place while the latter revolve in a circle of the box. The box not only serves to inclose and hold the friction-rollers and rings, as above described, but it also holds a body of oil, which rises high enough to partially surround the rollers and keep them constantly lubricated. This feature I also consider as a novelty.

This invention will be found of special value in water-wheels in removing the pressure from the step, which is difficult to reach and troublesome and expensive to keep in repair; also, greatly reducing the friction and insuring an easier and more regular action.

I do not claim, broadly, a suspended bearing, nor the use of friction-rollers, except as they are appplied as above described.

What I claim, and desire to secure by Letters Patent, is—

The capped supported oil-box C, formed with the hub $d$ and bottom $f$, and inclosing the rollers G G, journaled between the rings $h$ $i$, all constructed and arranged as described, so that the said step will be relieved from the weight of the shaft, substantially as set forth.

In witness whereof I have hereunto signed my name in the presence of two subscribing witnesses.

MARTIN BRIGGS.

Witnesses:
R. F. OSGOOD,
ARCHD. BAINE.